(12) United States Patent
Malkin et al.

(10) Patent No.: US 10,068,019 B2
(45) Date of Patent: *Sep. 4, 2018

(54) EFFICIENT EXTRACTION OF INTELLIGENCE FROM WEB DATA

(71) Applicant: International Business Machines Corporation, Armonk, NY (US)

(72) Inventors: Thomas K. Malkin, Northbrook, IL (US); Shivashankar M. Paragond, Gulbarga (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/433,081

(22) Filed: Feb. 15, 2017

(65) Prior Publication Data

US 2017/0161384 A1 Jun. 8, 2017

Related U.S. Application Data

(63) Continuation of application No. 14/477,357, filed on Sep. 4, 2014, now Pat. No. 9,646,047.

(51) Int. Cl.
*G06F 17/30* (2006.01)
*G06Q 50/00* (2012.01)
*G06N 5/02* (2006.01)

(52) U.S. Cl.
CPC .. *G06F 17/30864* (2013.01); *G06F 17/30321* (2013.01); *G06N 5/022* (2013.01); *G06Q 50/01* (2013.01)

(58) Field of Classification Search
CPC ........ G06F 17/30864; G06F 17/30321; G06Q 50/01; G06N 5/022
See application file for complete search history.

(56) References Cited

U.S. PATENT DOCUMENTS

| 8,676,875 B1 * | 3/2014 | Smith | H04L 51/32 705/37 |
| 9,646,047 B2 * | 5/2017 | Malkin | G06F 17/30424 |
| 2006/0271526 A1 * | 11/2006 | Charnock | G06Q 30/02 |

(Continued)

OTHER PUBLICATIONS

Rob High, The Era of Cognitive Systems: An Inside Look at IBM Watson and How it Works, 2012, IBM Corp., pp. 1-14.*

(Continued)

*Primary Examiner* — Leslie Wong
(74) *Attorney, Agent, or Firm* — Cantor Colburn LLP; Kurt Goudy (57) ABSTRACT

Embodiments are directed to a system for gathering and processing web data. The system provides an expression-based social media monitoring (SMM) tool that pulls from a world wide web an initial data universe that includes web data relevant to a targeted index that has been identified by an entity as being of importance to said entity. An initial set of themes relevant to the targeted index is pulled from the initial data universe, and an expression-based, cognitive data analysis tool codes the initial data universe under the initial set of relevant themes to filter portions of the initial data universe that fall under the initial set of relevant themes and portions of the initial data universe that do not fall under the initial set of relevant themes.

4 Claims, 10 Drawing Sheets

(56) References Cited

U.S. PATENT DOCUMENTS

| | | | |
|---|---|---|---|
| 2008/0114755 A1* | 5/2008 | Wolters | G06F 17/30873 |
| 2008/0208864 A1* | 8/2008 | Cucerzan | G06F 17/278 |
| 2012/0166180 A1* | 6/2012 | Au | G06F 17/27 |
| | | | 704/9 |
| 2014/0156673 A1* | 6/2014 | Mehta | H04L 29/08099 |
| | | | 707/748 |
| 2014/0222819 A1* | 8/2014 | Dies | G06F 17/30707 |
| | | | 707/740 |
| 2015/0120444 A1* | 4/2015 | Deshpande | G06Q 30/0255 |
| | | | 705/14.53 |
| 2015/0347523 A1* | 12/2015 | Patel | H04L 67/1097 |
| | | | 707/623 |
| 2016/0070800 A1 | 3/2016 | Malkin et al. | |
| 2016/0070805 A1 | 3/2016 | Malkin et al. | |
| 2016/0170814 A1* | 6/2016 | Li | G06F 9/542 |
| | | | 719/318 |

OTHER PUBLICATIONS

List of IBM Patents or Patent Applications Treated as Related; Date Filed: Feb. 15, 2017, 2 pages.

* cited by examiner

ILLUSTRATION: THEMES DISCOVERED ARE DEFINED BY KEYWORDS OBSERVED ONLINE

TARGETED INDICES AND CORRESPONDING THEME-BASED KEYWORDS

| Topic | Theme | Keywords |
|---|---|---|
| Consumer Connectedness With Health & Well-being | Wellness Program | wellness program, biometric testing, biometric screening, health risk questionnaire, onsite health clinic, health risk assessment, health assessment, behavior, modification program, tobacco cessation, weight management, health education, eating right, exercising, feeling motivated, motivated, work-life, life-work, physical health, mental health, play, life style management, optimal health, self care program, self care programs, vitality, seniors, caregivers, aging, lifelong well-being, well-being, healthy choices, oral health, health promotion classes, healthy living, healthy aging |
|  | Wellness Incentive | wellness incentive, wellness incentives, incentive dollars, health incentives, health incentive, incentive programs, incentive program, seniors, caregivers, aging |
|  | Work-life Program | work life platform, telecommuting, telecommute, telemedicine, flexible work schedule, flexible work, parental leave, reduced hours, community service time, adult leave, adult care, job share, emergency childcare, concierge service, on-site day care, travel-related dependent care, seniors, caregivers, aging |
|  | Interactive Health Communication | accessing web information, e-health, e-health technologies, patient provider communication, communicating with patients, patient communication, electronic medical record, emr, enhanced patient access, digital channels, digital channel, enhanced patient access through digital channels, digital communication, coordinated healthcare, continuous coordinated health care in the digital age, digital healthcare utilization, digital healthcare, digital health, cell phone, mobile phone, smartphone, interactive voice response, text messages, emails, interactive video, clinic-based interactive video, home-based webcams, personal monitoring devices, kiosks, dashboard, electronic medical record, electronic medical records, personal health records, web-based portals, social networking, secure chat, online forum, virtual caregiver, internet platform, electronic health, healthcare modernization, social media, mobile health, seniors, caregivers, aging, integrated care model, facebook, twitter, virtual care, digital care, digital health, telehealth, telemedicine, mhealth |
|  | Alternative Medicine | integrative medical, healing experience, conventional remedies, natural remedies, transformational counseling, health screening, advanced lab services, massage therapy, acupuncture, oriental medicine, skin rejuvenation, patient partnership, mind-body therapies, natural healing, testing, hormone therapy, hcg weight loss, patient centered healing, taking responsibility, alternative therapies, alternative approach, effective management, alternative treatment, natural therapies, herbalist, homeopath, chiropractor, seniors, caregivers, alternative healthcare, aging |

FIG. 3

| CONTENT | DATE | VENUE TYPE | HOST URL | URL | QUALITY | | |
|---|---|---|---|---|---|---|---|
| | | | | | RECOMMEND | HIGH QUALITY | GOOD FOOD |
| 315 | 315 | 315 | 315 | 315 | 15 | 11 | 9 |
| 315 | 315 | 315 | 315 | 315 | 15 | 11 | 9 |
| Originally Pos | 5/10/2013 | FORUMS | www.ar15.cc | http://www | 1 | -- | -- |
| #@! Best Pric | 5/25/2013 | BLOG | http://en.ne | http://en.ne | -- | -- | -- |
| Save 10% Off | 5/25/2013 | TWITTER | http://www. | http://twitte | -- | -- | -- |
| So we Know | 5/25/2013 | FORUMS | www.dogfor | http://www | -- | -- | -- |
| Are you look | 5/25/2013 | BLOG | http://raising | http://raising | 1 | -- | -- |
| As you can al | 5/25/2013 | BLOG | http://yourd | http://yourd | -- | -- | -- |
| I fed Blue Bu | 5/25/2013 | FORUMS | community.c | http://comm | -- | -- | -- |
| Memorial Da | 5/25/2013 | TWITTER | http://www. | http://twitte | -- | -- | -- |
| Your cat is re | 5/25/2013 | FORUMS | forum.grassc | http://forum | -- | -- | -- |
| Hi, some of y | 5/24/2013 | BLOG | http://dollys | http://dollys | -- | -- | -- |
| Yesterday, D | 5/24/2013 | BLOG | http://bryanj | http://bryan | -- | -- | -- |
| Kyro likes blu | 5/24/2013 | FORUMS | www.sphynx | http://www | -- | -- | -- |
| Blue Buffalo | 5/24/2013 | TWITTER | http://www. | http://twitte | -- | -- | -- |
| Implausible B | 5/23/2013 | BLOG | http://natur | http://natura | -- | -- | -- |
| Average Revi | 5/23/2013 | BLOG | http://home | http://home | -- | -- | -- |
| Average Revi | 5/23/2013 | BLOG | http://canid | http://canida | -- | -- | -- |
| Are you look | 5/23/2013 | BLOG | http://blueb | http://blue | -- | -- | -- |
| Average Revi | 5/23/2013 | BLOG | http://canid | http://canida | 1 | -- | -- |
| Available Cou | 5/23/2013 | BLOG | http://nod2 | http://nod2o | -- | -- | -- |
| Wilderness B | 5/22/2013 | BLOG | http://en.ne | http://en.net | -- | -- | -- |
| Blue Buffalo | 5/22/2013 | FORUMS | www.reddit. | http://www | -- | -- | -- |
| I was at the p | 5/22/2013 | FORUMS | www.dogfor | http://www | -- | -- | -- |
| Blue Buffalo | 5/22/2013 | TWITTER | http://www. | http://twitte | -- | -- | -- |
| Are you look | 5/22/2013 | BLOG | http://raising | http://raising | -- | -- | -- |
| Why do you | 5/22/2013 | FORUMS | www.dogfor | http://www | -- | -- | -- |
| I want to try | 5/22/2013 | FORUMS | www.dogfor | http://www | -- | -- | -- |
| I was at the | 5/21/2013 | FORUMS | www.dogfor | http://www | -- | -- | -- |
| I'm feeding | 5/21/2013 | FORUMS | www.lab-ret | http://www | -- | -- | -- |
| Save 10% Off | 5/21/2013 | TWITTER | http://www. | http://twitte | -- | -- | -- |
| Blue Buffalo | 5/21/2013 | FORUMS | www.ar15.cc | http://www | -- | -- | -- |
| Are you look | 5/21/2013 | BLOG | http://raisin | http://raising | -- | -- | -- |
| I had a simil | 5/21/2013 | FORUMS | mswers.yah | http://answe | -- | -- | -- |
| Free shipping | 5/21/2013 | TWITTER | http://www. | http://twitte | -- | -- | -- |
| Best of the | 5/21/2013 | FORUMS | answers.yah | http://answe | -- | -- | -- |
| Welcome to | 5/21/2013 | FORUMS | www.dogfor | http://www | -- | -- | -- |
| I prefer to fe | 5/20/2013 | FORUMS | forum.ameri | http://forum | 1 | -- | -- |
| Best food to | 5/20/2013 | FORUMS | answers.yah | http://answe | -- | -- | -- |
| Just got denr | 5/20/2013 | TWITTER | http://www. | http://twitte | -- | -- | -- |
| Quote: Origir | 5/20/2013 | FORUMS | www.yorkiet | http://www | -- | -- | -- |

FIG. 4

ILLUSTRATION OF VOLUME & SENTIMENT OF TARGETED INDICES

IN Q4 2012, COMPANY B LED WITH THE HIGHEST NET SENTIMENT SCORE AND COMPANY D WITH NET VOLUME

| Q4 2012 INDICES | | | | | |
|---|---|---|---|---|---|
| NET SENTIMENT INDEX (%) FOR Q4 2012 | | | | | |
| IMPORTANT INDUSTRY INDICES | COMPANY A | COMPANY B | COMPANY C | COMPANY D | COMPANY E |
| CONFIDENCE IN PRIVACY & SECURITY | - | -100 | - | - | -33 |
| CONSUMER CONNECTEDNESS WITH HEALTH & WELL-BEING | 88 | 100 | 100 | 71 | 100 |
| CONSUMER EXPERIENCE | -36 | 54 | 18 | -53 | -14 |
| CONSUMER TRUST & LOYALTY | -59 | -67 | 20 | -85 | -56 |
| HEALTHCARE REFORM | -9 | 100 | 100 | 78 | -50 |
| PURCHASE & RENEWAL INTENT | -71 | -100 | -100 | -100 | -71 |
| WEIGHTED NET SENTIMENT INDEX IN Q4 2012 | -16 | 42 | 35 | -26 | -5 |
| NET VOLUME INDEX (%) FOR Q4 2012 | | | | | |
| IMPORTANT INDUSTRY INDICES | COMPANY A | COMPANY B | COMPANY C | COMPANY D | COMPANY E |
| CONFIDENCE IN PRIVACY & SECURITY | - | 38 | - | - | 100 |
| CONSUMER CONNECTEDNESS WITH HEALTH & WELL-BEING | 77 | 7 | 5 | 25 | 100 |
| CONSUMER EXPERIENCE | 35 | 5 | 6 | 25 | 100 |
| CONSUMER TRUST & LOYALTY | 97 | 20 | 17 | 100 | 97 |
| HEALTHCARE REFORM | 75 | 100 | 3 | 4 | 17 |
| PURCHASE & RENEWAL INTENT | 88 | 25 | 25 | 100 | 88 |
| WEIGHTED NET VOLUME INDEX IN Q4 2012 | 64 | 37 | 5 | 19 | 72 |

EFFICIENT EXTRACTION OF INTELLIGENCE FROM WEB DATA

DOMESTIC PRIORITY

This application is a continuation of U.S. application Ser. No. 14/477,357, titled "EFFICIENT EXTRACTION OF INTELLIGENCE FROM WEB DATA" filed Sep. 4, 2014, the contents of which are incorporated by reference herein in its entirety.

BACKGROUND

The present disclosure relates in general to extracting, organizing and analyzing intelligence gathered from the World Wide Web. More specifically, the present disclosure relates to systems and methodologies for efficiently extracting, organizing and analyzing targeted intelligence from a variety of web locations, such as blogs, forums, news sites, Twitter, Facebook and others.

The World Wide Web is a system of interlinked hypertext documents that are accessed via the internet. With a web browser, an entity can view web data that may contain text, images, videos, and other multimedia and navigate between them via hyperlinks. Entities can also create and post web data containing text, images, videos and other multimedia. Thus, the web contains a vast amount of public commentary data on a vast array of subjects that have the potential to provide useful intelligence to a given entity. For example, the nature and scope of a complaint posted on an internet forum or social network about the wait times at hospitals is potentially useful competitive intelligence for a healthcare provider.

However, the high volume and diversity of raw, unstructured web data make it a challenge to transform it into structured, meaningful and useful intelligence. To address this challenge, so-called social media monitoring (SMM) tools have been developed to gather and analyze web data. Although the term "social media" implies a focus on "social" sites such as Facebook or channels such as Twitter, SMM search tools pull web data from a variety of location types such as blogs, forums, news sites, review sites, and others. A typical SMM search tool works by crawling web locations continuously and tagging them. Once tagged, the web locations are searched using some form of keyword-based query or search string that a user develops to find so-called "mentions" of specific words and phrases on the tagged pages. The SMM search tool then brings these "mentions" back into the tool's interface, which can then be read and organized in different ways.

One way to convey intelligence about web data is through social media indices. Examples of social media indices include The Nation's Restaurant News (NRN) Social 200 (available on the worldwide web) and The Wine Industry Social Media Index (available on the worldwide web). The NRN Social 200 index in particular is a daily look and ranking of the social media activities of the nation's largest restaurant chains. This index quantifies restaurant brand efforts and consumer engagement with a scoring from 0-1,000. A typical index is intended to summarize and aggregate disparate data into a simple and general format. Thus, indices are intentionally very broad, not nuanced, and not particularly actionable at an entity level. For example, when Red Lobster sees that its 7-day NRN Social 200 index has gone up or down by 4.34%, it is difficult for Red Lobster executives to really understand what is driving the change and take targeted, responsive action, if necessary.

If entities desire to move beyond broad social media indices and extract web intelligence targeted to the top-level inquiries that are important to their space, they typically must make a tradeoff between the complexity/sophistication of their inquiry and the efficiency, cost and complexity of the resources needed in order to provide reliable and useful web data responses at a more granular level. This is because such tasks rely heavily on keyword-based SMM search tools, and there is generally an inverse relationship between the complexity/sophistication of an initial inquiry and the reliability of the search results returned by keyword-based SMM search tools. In order to provide useful and reliable web data in response to complex and sophisticated inquiries, entities must typically apply ad hoc, labor intensive and unsystematic analysis on top of the keyword-based SMM search results.

SUMMARY

Embodiments are directed to a system for gathering and processing web data. The system provides an expression-based SMM search tool that pulls from the World Wide Web an initial data universe that includes web data relevant to a targeted index that has been identified by an entity as being of importance to the entity. An initial set of themes relevant to the targeted index is pulled from the initial data universe, and an expression-based, cognitive data analysis tool codes the initial data universe under the initial set of relevant themes to filter portions of the initial data universe that fall under the initial set of relevant themes and portions of the initial data universe that do not fall under the initial set of relevant themes.

Embodiments are further directed to a system for gathering and processing web data. The system includes a first module that pulls from the World Wide Web an initial data universe that includes web data relevant to a targeted index that has been identified by an entity as being of importance to the entity. An initial set of themes relevant to the targeted index is developed from the initial data universe. A second module codes the initial data universe under the initial set of relevant themes to filter portions of the initial data universe that fall under the initial set of relevant themes and portions of the initial data universe that do not fall under the initial set of relevant themes. The second module analyzes the portions of the initial data universe that do not fall under the initial set of relevant themes to identify any additional themes relevant to the targeted index. If additional relevant themes are identified, the second module further codes under the additional relevant themes the portions of the initial data universe that do not fall under the initial set of relevant themes. Thus, the targeted index is defined by the coded portions of the initial data universe that fall under the initial set of relevant themes, along with the coded portions of the data universe that fall under the additional relevant themes.

Embodiments are further directed to a method of gathering and processing web data. The method includes identifying a targeted index based on a top-level inquiry identified by an entity as being of importance to the entity. An initial data universe having web data relevant to the targeted index is pulled from the World Wide Web. An initial set of themes relevant to the targeted index is developed from the initial data universe. The initial data universe is coded under the initial set of relevant themes to filter portions of the initial data universe that fall under the initial set of relevant themes and portions of the initial data universe that do not fall under the initial set of relevant themes. Portions of the initial data universe that do not fall under the initial set of relevant themes are analyzed to identify any additional themes relevant to the targeted index. If additional relevant themes are identified, portions of the initial data universe that do not fall under the initial set of relevant themes are further coded under the additional relevant themes. Thus, the targeted index is defined by the coded portions of the initial data universe that fall under the initial set of relevant themes, along with the coded portions of the data universe that fall under the additional relevant themes.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 3 depicts an example of a targeted index and its discovered themes, along with the corresponding keywords, in accordance with one or more embodiments;

FIG. 4 depicts an example spreadsheet format for coded web data in accordance with one or more embodiments;

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

An inherent limitation of keyword-based SMM search methodologies is that their search results tend to be most reliable when responding to relatively simple and unsophisticated top-level inquiries. For example, the most reliable results are obtained for simple, activity-based queries, such as how many tweets, followers, likes, fans, etc. an entity may have relative to others. As noted previously herein, if entities desire to move beyond the more generalized social media indices and extract web intelligence targeted to the inquiries, issues or topics that are important to their space, they typically must make a tradeoff between the complexity/sophistication of their inquiry and the efficiency, cost and complexity of the resources needed in order to provide reliable and useful web data responses at a granular level. This is because such tasks rely heavily on keyword-based SMM search tools, and there is generally an inverse relationship between the complexity/sophistication of an initial inquiry and the reliability of the search results returned by keyword-based SMM search tools.

When keyword-based SMM search tools are used to pull a data universe in response to a complex/sophisticated inquiry, a significant percentage of irrelevant search results are returned. It has been observed that a range from approximately 46.5% to 94.5% of irrelevant data is pulled by commercially available keyword-based SMM search tools in response to complex and sophisticated top-level inquiries. Furthermore, because current keyword-based SMM search tools cannot properly code across multiple indices and themes, they have difficulty accurately capturing an item of web data that has different opinions covering multiple indices and themes. In order to provide useful and reliable web data in responses to complex and sophisticated inquiries, entities must apply ad hoc, labor intensive and unsystematic analysis on top of keyword-based SMM search results.

The present disclosure and exemplary embodiments described herein provide systems and methodologies for extracting, organizing and analyzing targeted intelligence from a variety of web locations, such as forums, blogs, news sites, review sites, social sites and others. More specifically, the present disclosure and exemplary embodiments improve the efficiency and reduce the cost and complexity of resources needed in order to provide reliable and useful responses to targeted, complex and sophisticated web inquiries.

Turning now to an overview of the disclosed embodiments, targeted, complex and sophisticated inquiries are identified for a subject entity. Typically, the targeted inquiries will be relevant to an immediate and pressing concern of the subject entity. For example, in support of its strategy to prepare well in advance of healthcare law changes, an insurer may need a granular understanding of what web data reveals about aspects of a healthcare reform law that are most relevant to the payer's business. The inquiries are developed and refined into targeted indices and supporting themes, along with the corresponding theme-based keywords, through several interactions with the people or groups having the most knowledge about the entity's overall strategy and goals. The corresponding keywords are further refined into robust search strings that are used to pull an initial universe of web data responses from the World Wide Web.

If a keyword-based SMM search tool is used to pull the initial data universe, the robust search strings developed for each theme will, as expected, return a significant percentage of irrelevant search results that do not make mention of the entity/brand and the targeted index and the theme. Also as expected, because current keyword-based SMM search tools cannot properly code across multiple indices and themes, the search will have difficulty accurately capturing an item of web data that has different opinions covering multiple indices and themes. Thus, for complex and sophisticated inquiries, these initial results from keyword-based SMM search tools tend to be unreliable and not very actionable. Without benefit of the present disclosure, converting these keyword-based SMM results into useful and reliable web data requires the application of ad hoc, labor intensive and unsystematic analysis on top of the keyword-based SMM results.

The present disclosure mitigates the tradeoff that typically must be made between the complexity and sophistication of the top-level web inquiry and the efficiency, cost and complexity of the resources needed in order to provide reliable and useful responses. Toward this end, the present disclosure in one or more embodiments provides a systematic analysis methodology on top of the keyword-based SMM results. The disclosed systematic analysis methodology includes a statistically based sampling approach that samples the data to arrive at a predetermined confidence level (e.g., 90% confidence level with a +/−5% standard error). In particular, for each sample size determined, which may be arrived at through using a statistical sampling calculator, an analyst may randomly pull comments from the universe of data pulled by an SMM search tool (e.g., 390,000 relevant and irrelevant comments) and read as many comments as necessary to arrive at a sample of "relevant" mentions for each subject entity. More comments than the sample may have to be read in order to arrive at a "relevant" sample. This relevant sample thus serves as the basis for all subsequent analyses, except for the general brand/company volume measurement that can be based solely on machine-based output. In addition to the above described web-based data intelligence, other intelligence sources (e.g., enterprise data) may be incorporated within the disclosed systems and methodologies to provide even further insights and actionable takeaways.

To even further mitigate the impact of the above-described tradeoff, the present disclosure in one or more embodiments replaces the keyword-based SMM search tool with a modified SMM search tool wherein the keyword-based web searching capability is modified to instead incorporate a robust expression-based cognitive data analysis technology such as IBM Watson. IBM Watson is an expression-based, cognitive data analysis technology that processes information more like a human than a computer, through understanding natural language, generating hypotheses based on evidence and learning as it goes. Additionally, expression-based, cognitive computer analysis provides superior computing power to keyword-based computer analysis for a number of reasons, including the more flexible searching capabilities of "word patterns" over "keywords" and the very large amount of data that may be processed by expression-based cognitive data analysis. As described in more detail later in this disclosure, expression-based cognitive data analysis methodologies may also be incorporated into other actions of the disclosed methodology to even further mitigate the above-described tradeoff.

In addition to applying the disclosed statistically-based sampling approach to make SMM results more reliable and actionable, one or more embodiments further provide an analytic process that derives additional insights across all of the targeted indices and themes, and convey the insights in the form of more actionable, "storytelling" takeaways. This eliminates the need for entities to further interpret and make connections amongst the targeted indices and themes from all of the representative comments within each theme of every targeted index. For example, simply conveying results in a bar graph showing that a targeted index, "Consumer Experience," is more negative because the theme, "Payment/Billing/Coverage," is driving most of the negative conversations is a partially actionable takeaway. However, an even more actionable takeaway is to also convey that, in addition to understanding "Consumer Experience" through its themes, one of the reasons the "Consumer Experience" index is more negative is because there are nine (9) stories discovered conveying consumer concerns amongst all payers across many themes defining "Consumer Experience" and that the two stories driving the "Consumer Experience" index applicable to the subject entity are "Rx Home Delivery" and "Refusal of Treatment." The "storytelling" analytic process may also determine an entity's share of story relative to others, or share of conversation relative to others on a given story.

Figure 1:
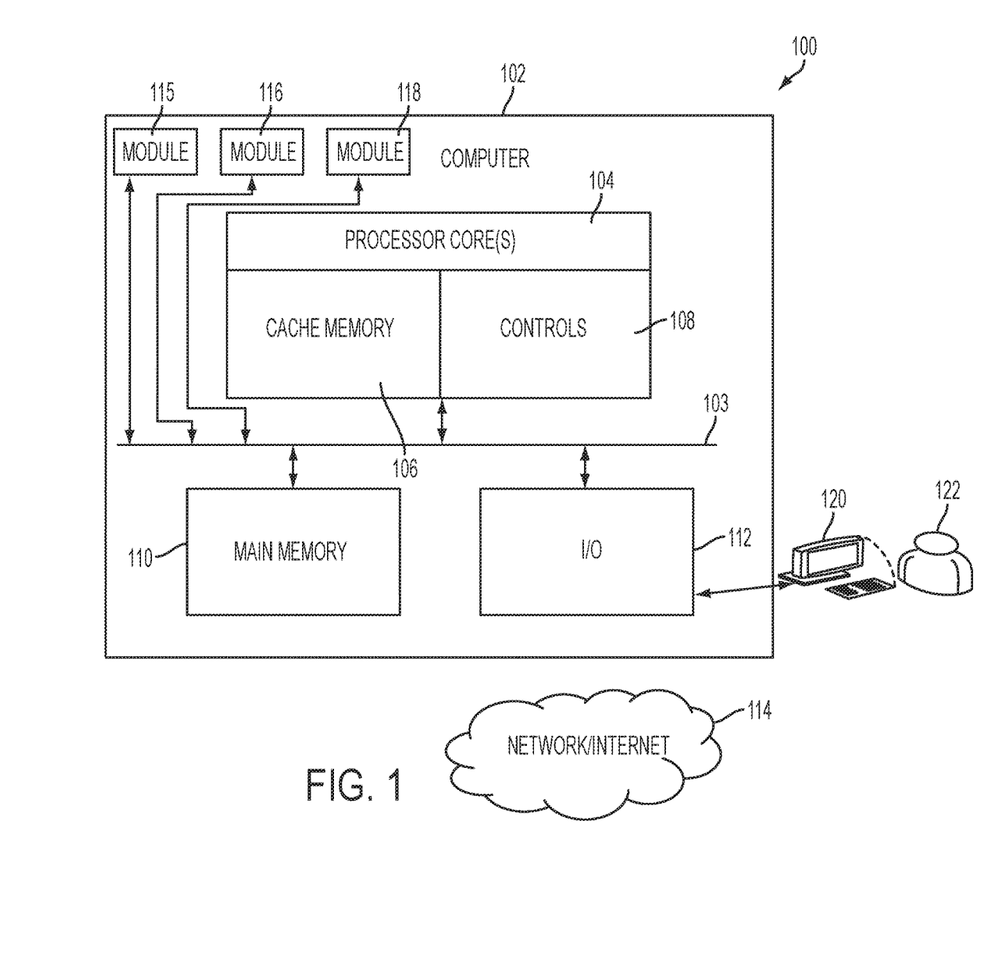
FIG. 1 depicts a block diagram illustrating an example of a computer system in accordance with one or more embodiments.

Turning now to the drawings in greater detail, wherein like reference numerals indicate like elements, FIG. 1 illustrates an example of a computer system 100 including an exemplary computing device ("computer") 102 having modules 115, 116, 118 configured to support SMM web data extraction and analysis (module 115), the disclosed statistically-based sampling approach to make SMM results more reliable and actionable (module 116), a further analytic process that derives additional insights across all of the indices and themes and conveys the insights in a more actionable, "storytelling" takeaways (module 116) and the merging of other, non-web data into the analysis (module 118), all in accordance with the present disclosure. Module 115 may be implemented as a contemporary keyword-based SMM search tool, or as a modified, expression-based, cognitive SMM search tool. Module 116 may be implemented using a commercially available spreadsheet product such as Microsoft Excel. Excel includes powerful but seldom used functions that very easily create automated tasks and custom logic within macros. Macros provide an ideal way to save time on predictable, repetitive tasks as well as standardize document formats. Even greater automation may be achieved by implementing module 116 using a more sophisticated expression-based, cognitive data analysis technology such as IBM Watson. As previously noted, IBM Watson is an expression-based cognitive technology that processes information more like a human than a computer, through understanding natural language, generating hypotheses based on evidence and learning as it goes.

Exemplary computer system 100 further includes a network/internet 114, which connects computer 102 to additional systems (not depicted) and may include one or more wide area networks (WANs) and/or local area networks (LANs) such as the internet, intranet(s), and/or wireless communication network(s). Computer 102 and additional system are in communication via network 114, e.g., to communicate data between them. A user interface 120 (e.g., a display monitor and a keyboard) is in communication with computer 102, and a user (e.g., a data analyst) 122 interfaces with computer 102 through user interface 120.

Exemplary computer 102 further includes processor cores 104, main memory ("memory") 110, and input/output component(s) 112, which are in communication via bus 103. Processor cores 104 include cache memory ("cache") 106 and controls 108. Cache 106 may include multiple cache levels (not depicted) that are on or off-chip from processor 104. Memory 110 may include various data stored therein, e.g., instructions, software, routines, etc., which, e.g., may be transferred to/from cache 106 by controls 108 for execution by processor 104. Input/output component(s) 112 may include one or more components that facilitate local and/or remote input/output operations to/from computer 102, such as user interface 120 and modems, network adapters, etc. (not depicted). Although a single computer system 100 is shown for ease of illustration, the functionality of computer system 100, along with the various processes described herein, may be implemented across a plurality of computers and a plurality of users/analysts 122. Additionally, although various computer-based operations are described with an emphasis on the support provided by a particular component of computer system 100 (e.g., modules 115, 116, 118), it will understood by those skilled in the relevant arts that many aspects of computer system 100 (e.g., processors, memories, controls, etc.) participate in and contribute to carrying out any computer-based operation described herein.

Figure 2:
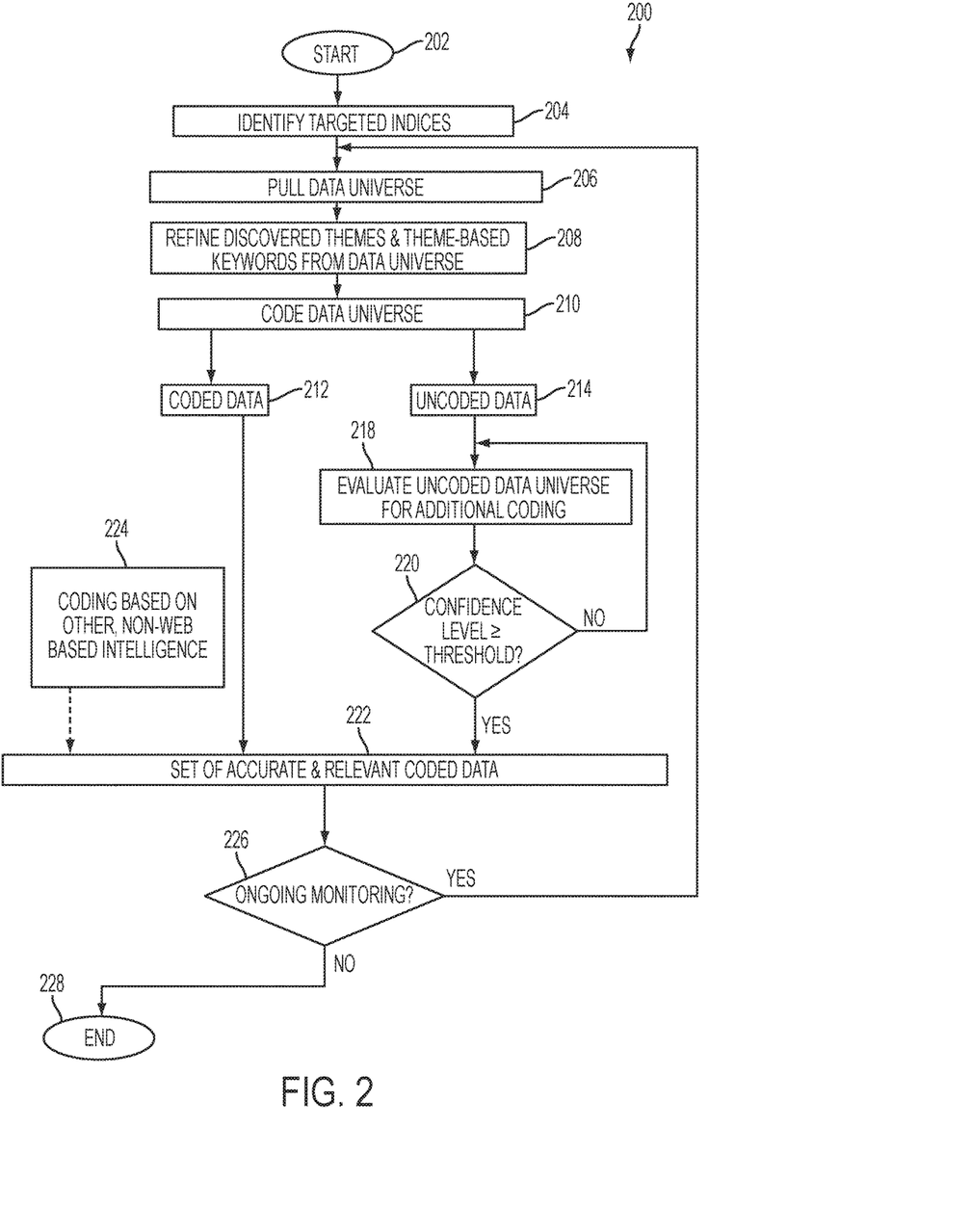
FIG. 2 depicts a flow diagram illustrating a methodology for applying the disclosed statistically-based sampling approach to extract targeted, reliable and actionable web data in accordance with one or more embodiments.

FIG. 2 is a flow diagram illustrating a methodology 200 for applying the disclosed statistically-based sampling approach to make SMM results more reliable and actionable in accordance with one or more embodiments. In general, methodology 200 may be implemented by using the configuration shown in FIG. 1, including analyst 122 using computer system 100, with a particular utilization of module 115, module 116, module 118 and network/internet 114. As shown in FIG. 2, methodology 200 starts at block 202. At block 204, analyst 122 (shown in FIG. 1) works with an entity to identify targeted indices and discover an initial set of themes related thereto. In general, the targeted indices are derived from the top-level inquiries that are important to the entity's overall goals and strategies. Keeping with the previously described example, an insurer may need to understand what web data reveals about aspects of a healthcare reform law that are most relevant to the payer's business. Working with the payer entity, and incorporating the support of computer system 100 (shown in FIG. 1) as needed, analyst 122 develops and refines top-level inquiries, targeted indices (derived from top-level inquiries) and initial themes discovered along with their corresponding keywords, through several interactions with the people or groups having the best knowledge of the entity's overall strategy and goals.

Continuing with methodology 200 of FIG. 2, at block 206, the robust search strings for each theme and corresponding targeted index are input into an SMM search tool (module 115 of FIG. 1), which pulls a universe of web data results by crawling the internet (via network/internet 114 of FIG. 1). At block 208, themes discovered and theme-based keywords are further refined based on further analysis of the web data universe, incorporating the support of computer system 100 (shown in FIG. 1) as needed. An example of a targeted index and themes discovered, along with their corresponding keywords that may be developed by block 208, is shown by a table 300 in FIG. 3.

At blocks 210 and 212, coding is applied to the entire universe of relevant online conversations pulled for each targeted index and its corresponding themes as indicated at blocks 206 and 208. Blocks 210 and 212 may be supported by module 116 of FIG. 1, and module 116 may be implemented using a commercially available spreadsheet product such as Microsoft Excel. Excel includes powerful but seldom used functions that very easily create automated tasks and custom logic within macros. Macros provide an ideal way to save time on predictable, repetitive tasks as well as standardize document formats. Alternatively, even greater automation may be achieved by implementing module 116 using a more sophisticated cognitive data analysis technology such as IBM Watson. IBM Watson is a cognitive technology that processes information more like a human than a computer, through understanding natural language, generating hypotheses based on evidence and learning as it goes.

Block 214 isolates any online conversations that remain uncoded, and block 218 samples the uncoded web data universe to discover any additional coding information that may form the basis for additional coding, such as additional targeted inquiries, targeted indices, supporting themes, etc., again incorporating the support of computer system 100 (shown in FIG. 1) as needed. The sampling is iterative and continues until a desired level of confidence is reached that no relevant conversations are missed in the entire universe of web data. The sentiment analysis is refined by augmenting the Boolean language that comprises the search strings. Using computer system 100 (shown in FIG. 1), decision block 220 determines whether the confidence level is above or equal to a desired threshold level. If the answer to decision block 220 is yes, methodology 200 proceeds to block 222. If the answer to decision block 220 is no, methodology 200 returns to block 218 until the desired confidence threshold is achieved.

At block 222, the web data universe for a given subject matter has been filtered to a set of highly accurate, relevant and coded web data. The coding is based on the various filters developed throughout methodology 200, including but not limited to targeted inquiries, targeted indices, supporting themes, entities of interest (e.g., brands, products, etc.) and others. FIG. 4 shows a portion of a table 400 that illustrates an example of how block 222 may code the filtered and highly accurate web data universe. Table 400 is illustrated in a spreadsheet format similar to the format used in an Excel spreadsheet. Table 400 displays targeted indices ("Quality" for example) and corresponding discovered themes ("Recommend," "High Quality," "Good Food," etc.), along with related headings such as "Content," "Data," "Venue Type," "HOST URL," and "URL," configured and arranged as shown. For example, under the targeted index, "Quality," the following content is coded under the discovered theme, "Recommend": "Originally Posted By Londo: I use and recommend Blue Buffalo and Taste of the Wild. Both are grain free premium dog foods . . . Not inexpensive, but both are well respected brands. My dogs thrive on them. Yeah, my GSD has done great on Taste Of The Wild—and I think it'll have the result desired by the OP . . . —georgestrings." This content is also coded by its date (May 10, 2013), venue type (FORUMS), HOST URL (www.ar15.com) and URL. The illustrated format and coding of table 400 are shown as an example and a variety of formats and coding contemplated by the present disclosure.

Returning to methodology 200 of FIG. 2, optionally, the filtered, highly accurate and relevant comments of block 222, which have already been coded, may at block 224 be augmented by and further coded with other, non-web based intelligence data (e.g., enterprise data). Adding the coding of block 224 provides the potential to develop even more details about what is driving the targeted index results, thereby provide even further granularity, insights and actionable takeaways. Decision block 226 determines whether the analysis requires so-called "monitoring" in which the relevant data is updated. If the answer at decision block 226 is no, methodology 200 ends at block 228. If the answer at decision block 226 is yes, methodology 200 returns to block 206 and continues to mine for emerging targeted inquiries, targeted indices, supporting themes, etc. for an ongoing discovery process. For example, as an industry evolves, inquiries, indices, themes, etc. are likely to emerge as well as the web data consumer language related thereto. With each mining, the search strings are created and/or augmented, applied to a web data universe, then coded iteratively to reduce the likelihood that relevant conversations have been missed.

As noted herein, the various actions that form methodology 200 may be a combination of manual and computer-executed data processing actions performed, for example, by analyst 122 using computer system 100. Certain actions of methodology 200 (e.g., portions of blocks 204, 208, 218, etc.) require a level of cognitive analysis that is best performed by analyst 122 (shown in FIG. 1), while other actions of methodology 200 (e.g., portions of blocks 206, 210, 218, etc.) require a level of cognitive analysis that is best performed by computer-executed data processing such as computer system 100 (shown in FIG. 1). The efficiency provided by methodology 200 is even further enhanced by minimizing the manual actions and maximizing the computer-executed data processing actions. In general, a relatively higher overall efficiency, and hence a higher level of computer-executed data processing actions for methodology 200 are achieved when module 115 is implemented as the more robust modified, expression-based, cognitive SMM search tool, and when modules 116 and/or 118 are implemented as a more robust expression-based, cognitive data analysis system such as IBM Watson. As noted previously herein, IBM Watson is a cognitive technology that processes information more like a human than a computer, through understanding natural language, generating hypotheses based on evidence and learning as it goes. Thus, the more robust the computer-executed data processing tool used to implement modules 115, 116, 118, the less effort and time required from analyst 122 in order to arrive at a desired confidence level (decision block 220) for the data assembled at block 222.

Figure 5:
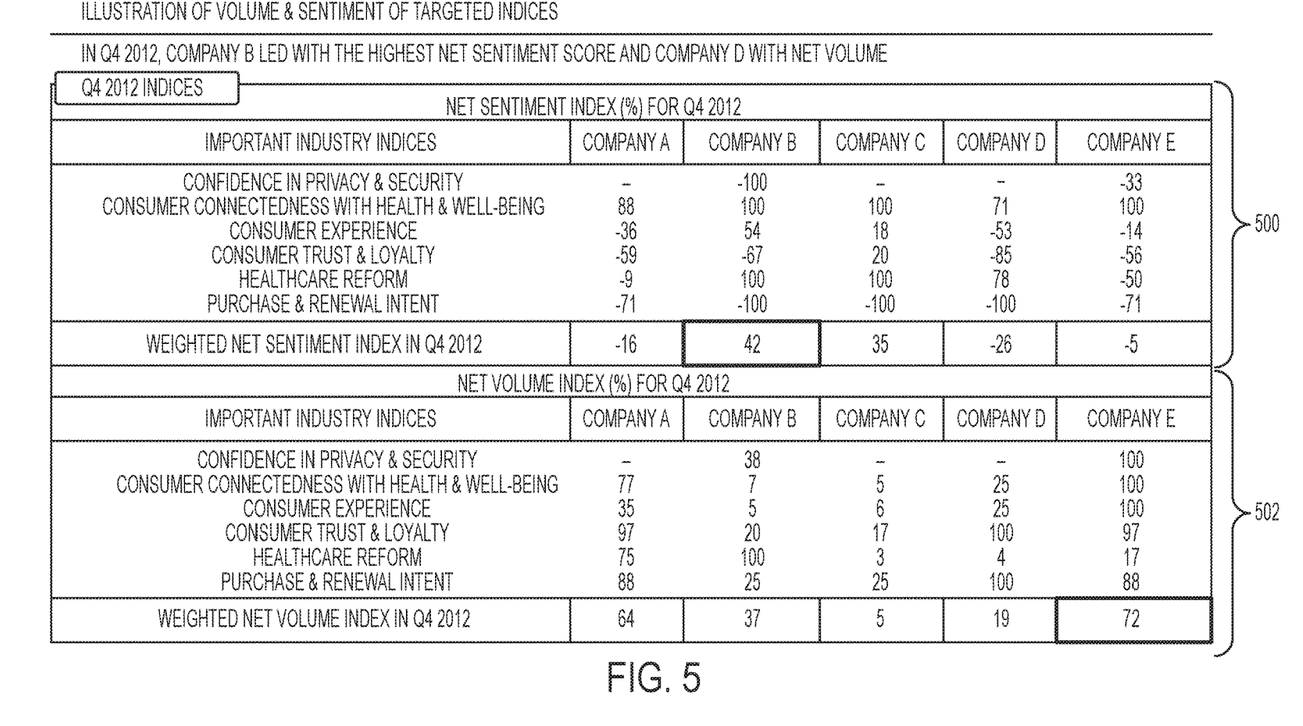
FIG. 5 depicts a sample format for presenting a "Net Sentiment" index and a "Net Volume" index which are a representation of all targeted indices weighted by volume of conversation for each targeted index in accordance with one or more embodiments.
Figure 6:
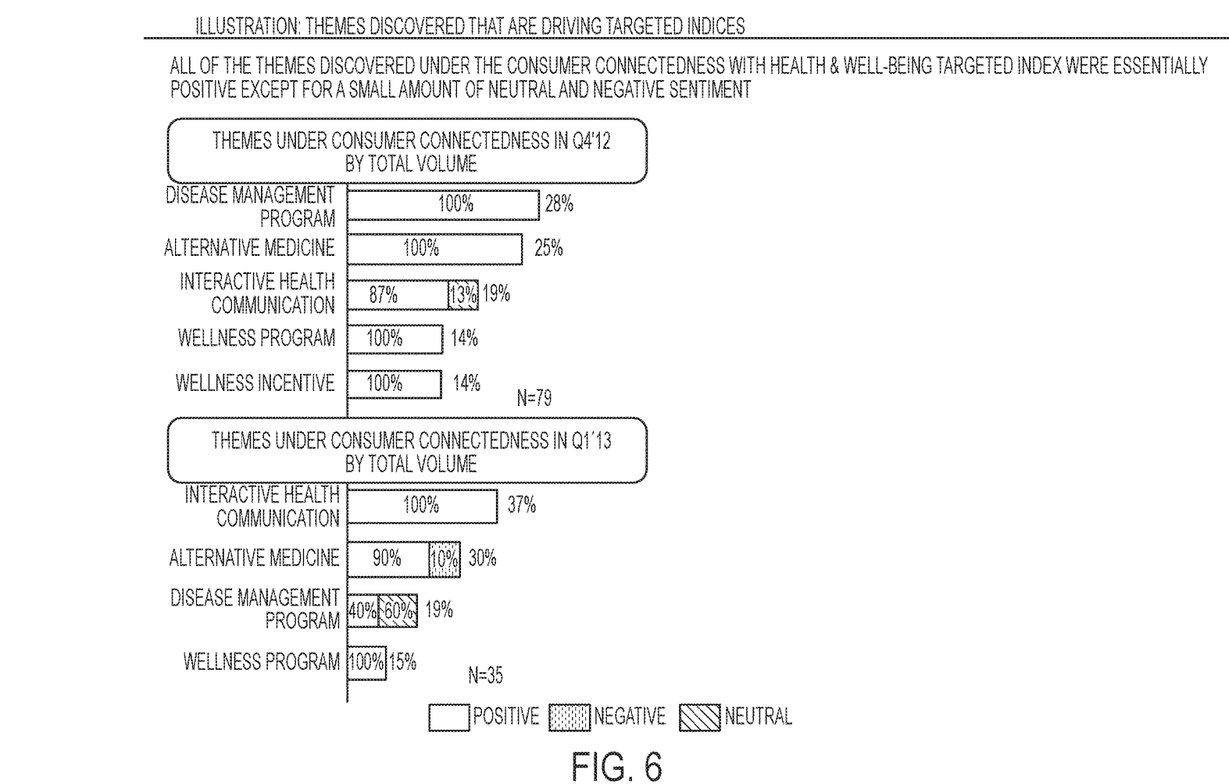
FIG. 6 depicts a sample format for presenting themes that drive a targeted index in accordance with one or more embodiments.
Figure 7:
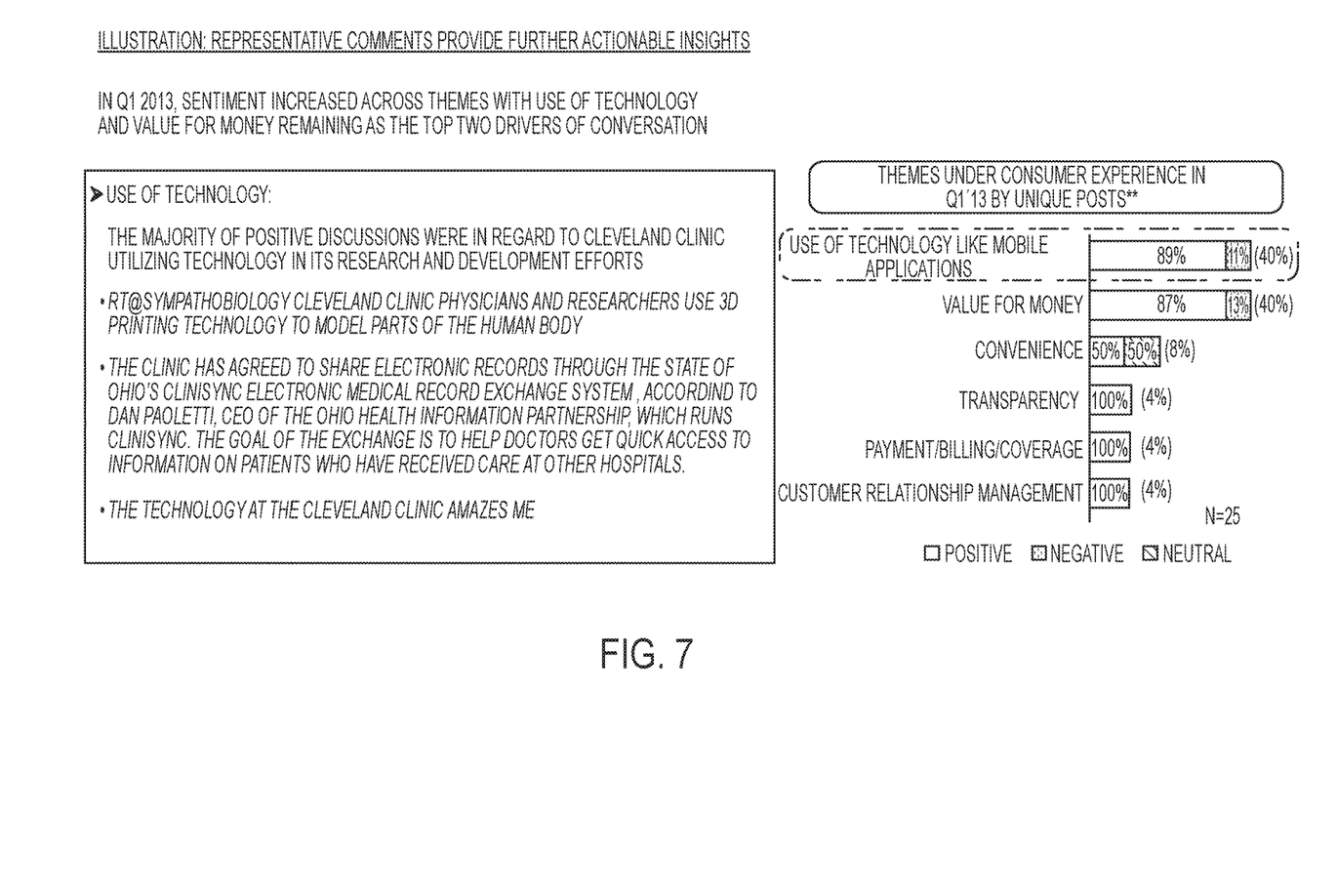
FIG. 7 depicts a sample format for presenting representative comments/examples that provide further actionable insights in accordance with one or more embodiments.

In order to gain insights into what is driving targeted indices, the extracted, coded web data results generated at block 222 of methodology 200 may be further processed, organized in a variety of ways and represented visually on user interface 120 (shown in FIG. 1), examples of which are shown in FIGS. 5, 6 and 7. FIG. 5 illustrates examples of how targeted indices may be developed from the results generated at block 222 (shown in FIG. 2) and organized into tables. The extracted, coded web data of block 222 is processed to yield Table 500, which shows the "Net Sentiment" indices and Table 502, which shows the "Net Volume" indices. The indices of each table (500, 502) are listed under the heading "Important Industry Indices," with the index scores as shown for each of Companies A-E.

The individual index scores may be weighted in order to reflect their relative importance. For any given targeted index, in regard to the "Net Volume" index (Table 502), the company that has the most positive, negative, and neutral discussions becomes the industry base or benchmark at 100%. The volume index for every other company on a given targeted index is thus determined by dividing their respective volumes by the company with the industry benchmark. The highest index score is set to 100, the lowest index score is set to 0, and the remaining scores are weighted within that range. As shown in FIG. 5, under the "Net Volume Index" Table 502, Company B led the competitive set on the "Healthcare Reform" targeted index.

Additionally, the index scores for "Net Sentiment" index (Table 500) may be calculated as the difference between positive and negative comments divided by the sum of the positive and negative comments. This ensures that the volume of conversations for any given company does not bias the sentiment. For example, if there are 7,000 positive comments and 3,000 negative ones, the "Net Sentiment Index" score would be 40% ((7,000–3,000)/10,000) Likewise, if there are 600,000 positive comments and 400,000 negative comments, the "Net Sentiment Index" score would be 20% ((600,000–400,000)/1,000,000). Furthermore, the highest index score is set to 100, the lowest index score is set to –100, and the remaining scores are weighted within that range. As shown in FIG. 5, under "Net Sentiment Index" Table 500, Companies B and C led the competitive set on the "Healthcare Reform" targeted index.

Each targeted index (e.g. "Consumer Connectedness with Health & Well-Being, Consumer Trust & Loyalty," etc.) under "Net Sentiment Index" and "Net Volume Index" in Tables 500 and 502 is multiplied by a weighted percentage, which is calculated as the number of conversations for each targeted index divided by the sum of all relevant conversations gathered for all of the targeted indices. For example, if there are 100,000 relevant conversations, and 20,000 of the relevant conversations are for "Consumer Trust and Loyalty" and 15,000 of the relevant conversations are for "Confidence in Privacy and Security," the weighted percentages would be 20% and 15%, respectively. Thus, an overall index (e.g., "The Healthcare Industry Index" or "The Healthcare Industry Index for Insurers" or "The Healthcare Industry Index for Providers", etc.) is derived from the sum of the weighted, targeted indices.

FIG. 6 illustrates another option for how the extracted, coded web data results generated at block 222 of methodology 200 (shown in FIG. 2) may be organized and represented visually on user interface 120 (shown in FIG. 1) in order to gain insights into what is driving targeted indices. FIG. 6 provides a better understanding of the meaning behind the targeted indices by showing more detail about the themes that are driving the indices. More specifically, the themes under "Consumer Connectedness in Q4 of 2012 are depicted by percentage of positive, negative, and neutral sentiment as well as the percentage of total mentions to quantify which themes are playing a greater role in driving the conversations around a targeted index. To show changes over time, FIG. 6 also compares the themes under "Consumer Connectedness" in Q4 of 2012 to the themes under "Consumer Connectedness" in Q1 of 2013 by total volume. In making this comparison, it can be observed that all of the themes discovered under "Consumer Connectedness with Health & Well-Being" in Q4 2012 were essentially positive except for a small amount of neutral and negative sentiment but that one theme in particular ("Disease Management Program) in Q1 2013 under "Consumer Connectedness" had its majority of sentiment as negative (60%).

FIG. 7 illustrates another option for how the extracted, coded web data results generated at block 222 of methodology 200 (shown in FIG. 2) may be organized and represented visually on user interface 120 (shown in FIG. 1) to provide even further understanding of the meaning behind the targeted indices and themes (shown in FIGS. 5 and 6) by showing representative comments. For example, for the themes under the targeted index "Consumer Experience," taken in Q1 2013, representative examples of the comments driving one of the themes discovered under "Consumer Experience," "Use of Technology like Mobile Applications," are shown. As indicated in FIG. 7, in Q1 2013, sentiment was significantly positive for the themes, "Use of Technology Like Mobile Applications" and "Value for Money," and both themes accounted for 80% of the mentions generated amongst the six themes discovered.

Figure 8:
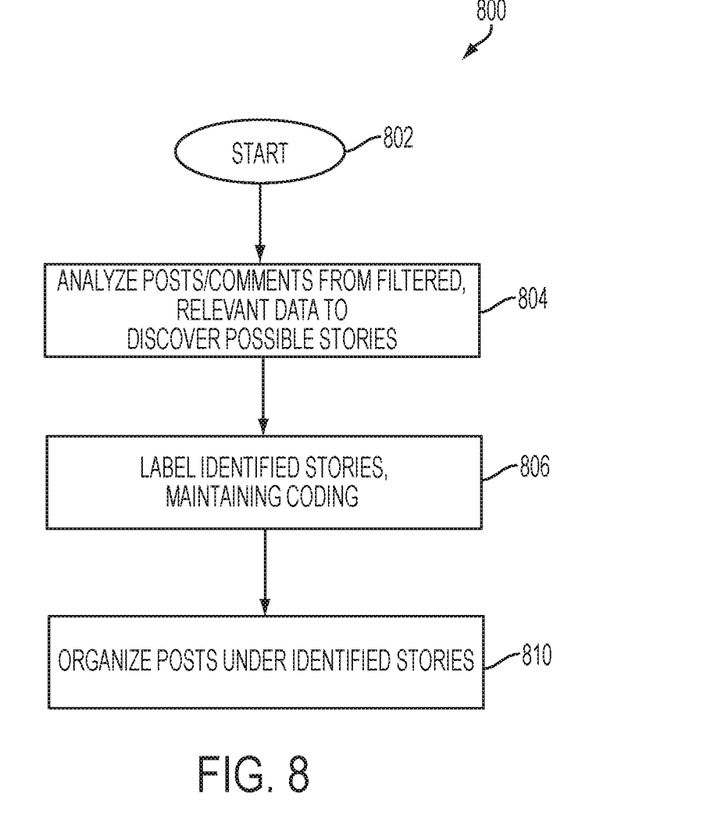
FIG. 8 depicts a flow diagram illustrating a methodology for developing narrative stories discovered that further explain the targeted indices.

In addition to methodology 200 shown in FIG. 2, which applies the disclosed statistically-based sampling approach to make SMM results more reliable and actionable, FIG. 8 depicts a methodology 800 that is a further analytic process applied to the extracted, coded web data of block 222 (shown in FIG. 2) in order to derive additional insights across all of the targeted indices and discovered themes, and convey the insights in the form of more actionable, "storytelling" takeaways. Although the disclosed targeted indices and themes provide significant insight, high level executives are likely to further still ask "What's the story" behind the indices. In other words, it is unlikely that busy executives would have time to dig into the minutia of a report and read the representative comments. Furthermore, if one were to tell executives at Company D that their "Healthcare Reform" index was being driven by the themes, "Coverage and Cost," they would likely ask for an explanation of the story or stories driving those themes and, furthermore, would likely ask what is Company D's share of story relative to the competitive set.

Thus, methodology 800 shown in FIG. 8 eliminates the need for entities to further interpret and make connections amongst the targeted indices and themes from all of the representative comments within each theme of every targeted index. For example, simply conveying results in a bar graph showing that an index, "Consumer Experience," is more negative because the theme, "Payment/Billing/Coverage," is driving most of the negative conversations is a partially actionable takeaway. However, it is considerably more actionable to also convey that, in addition to understanding "Consumer Experience" through its discovered themes, one of the reasons the "Consumer Experience" index to be more negative is because nine (9) stories discovered conveying consumer concerns have been identified amongst all payers across many themes defining "Consumer Experience," and that the two stories driving the "Consumer Experience" targeted index which are applicable to one particular organization amongst all pilot participants are "Rx Home Delivery" and "Refusal of Treatment." The "storytelling" analytic process may also be applied broadly to determine an entity's share of story relative to others, or share of conversation relative to others on a given story.

As shown in FIG. 8, methodology 800 begins at block 802. At block 804, for all targeted indices and supporting themes, the underlying posts/comments are analyzed to discover possible stories. At block 806, each identified story is labeled, and the original coding of the post/comment back to its original targeted index and theme is maintained. At block 810, the posts supporting the stories are reviewed and organized into the identified stories. These stories provide further explanation of what is driving the targeted indices. Because of the way methodology 200 (shown in FIG. 2) and methodology 800 structure and organize the overall data (e.g., top-level inquiries coded to targeted indices coded to supporting themes coded to underlying posts/comments coded to discovered stories), a wide variety of explanatory details can be provided in a wide variety of formats, including where a story is being generated (e.g., New York Times, Press Release, Trade Journal, etc.), through what social channels is a given story primarily being shared (e.g., Facebook, LinkedIn, blogs, forums, Twitter, etc.), and who are the influencers or key voices emerging in a given story, for example. This results in even better and more actionable competitive intelligence.

Similar to methodology 200 (shown in FIG. 2), the various actions that form methodology 800 may be a combination of manual and computer-executed data processing actions performed, for example, by analyst 122 (shown in FIG. 1) using computer system 100 (shown in FIG. 1). Certain actions of methodology 800 (e.g., portions of blocks 804, 810, etc.) require a level of cognitive analysis that is best performed by analyst 122, while other actions of methodology 800 (e.g., portions of blocks 804, 806, etc.) require a level of cognitive analysis that is best performed by computer-executed data processing such as computer system 100 (e.g., by modules 116 and/or 118). The efficiency provided by methodology 800 is even further enhanced by minimizing the manual actions and maximizing the computer-executed data processing actions. In general, a relatively higher overall efficiency, and hence a higher level of computer-executed data processing actions for methodology 800 are achieved when modules 116 and/or 118 are implemented as a more robust expression-based, cognitive data analysis system such as IBM Watson. As noted previously herein, IBM Watson is a cognitive technology that processes information more like a human than a computer, through understanding natural language, generating hypotheses based on evidence and learning as it goes.

Figure 9:
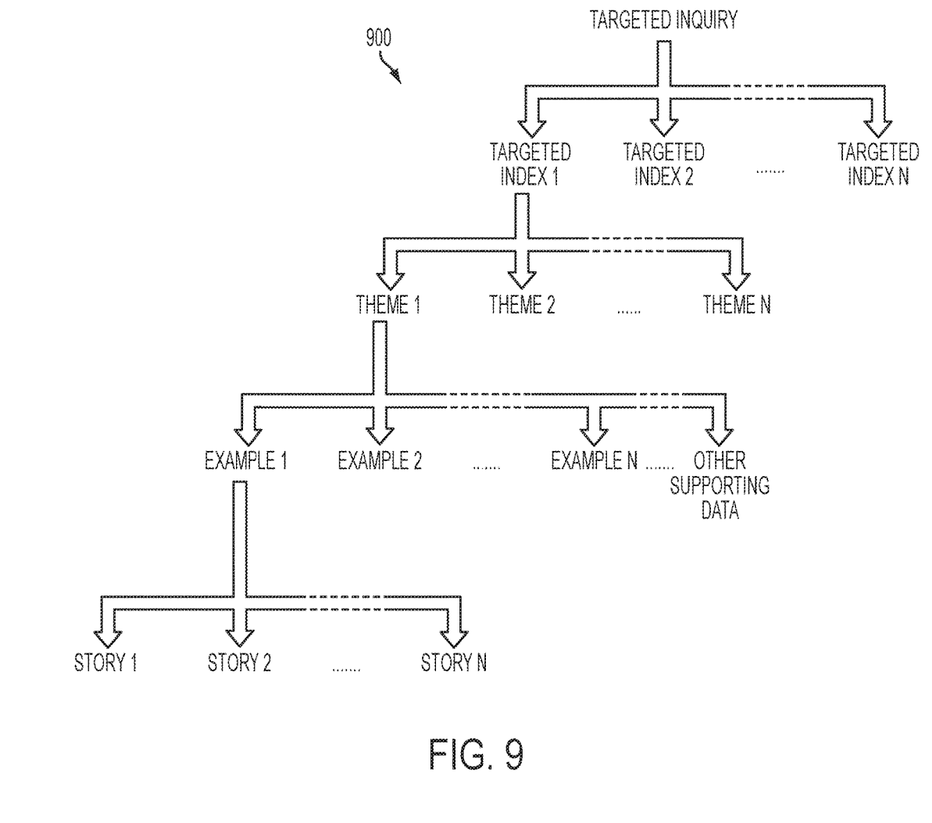
FIG. 9 depicts a diagram illustrating a structure and relationship between targeted inquiries, targeted indices, discovered themes, representative comments/examples as well as other supporting data, and narrative stories discovered that further describe the targeted indices in accordance with one or more embodiments.

FIG. 9 is a diagram 900 illustrating an example of the coded linkage that methodology 200 (shown in FIG. 2) and methodology 800 (shown in FIG. 8) create between targeted inquiries, targeted indices, underlying themes, supporting representative comments/examples and other supporting data, and discovered stories in accordance with one or more embodiments. As shown in FIG. 9, top-level targeted inquiries are coded to targeted indices which are coded to supporting themes, which are coded to underlying example posts/comments and, optionally, other supporting data, which are coded to discovered stories. This structure allows the web data results to be further processed and organized in a variety of ways and represented visually on user interface 120 (shown in FIG. 1), examples of which are shown in FIGS. 5, 6 and 7 and were previously described in greater detail herein.

Figure 10:
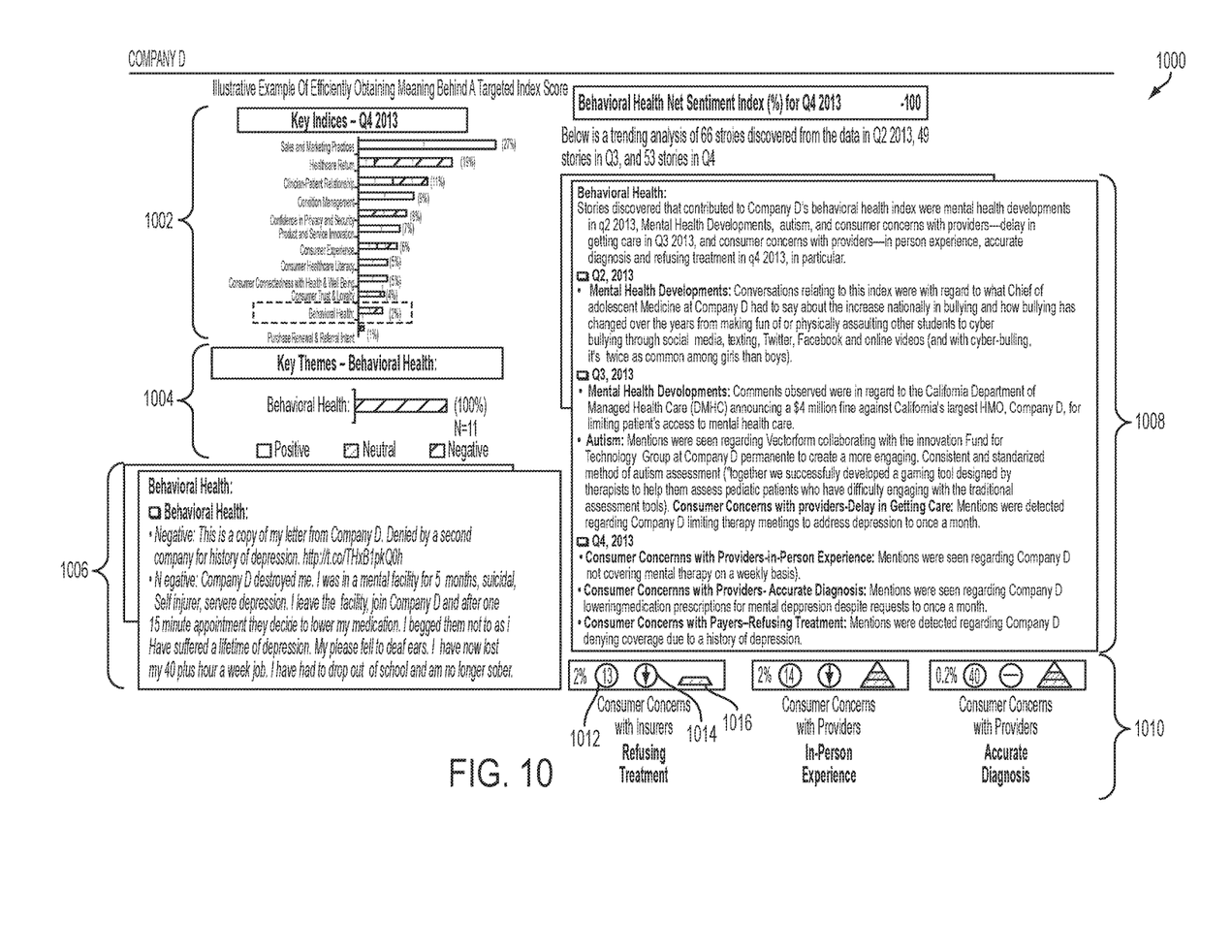
FIG. 10 depicts a sample format for providing efficient meaning as to what is driving the score of a targeted index through the integration and presentation of a targeted index, theme or themes discovered, representative comments/examples of such theme or themes that provide further actionable insights, and narrative stories discovered that further explain the score of a targeted index across multiple periods of time in accordance with one or more embodiments.

FIG. 10 depicts a diagram 1000 of another example of a format for integrating and presenting targeted indices, themes, stories and examples that provide further actionable insights in accordance with one or more embodiments. Diagram 1000 includes five sections, 1002, 1004, 1006, 1008, 1010. Section 1002 shows the targeted key indices. Section 1004 shows discovered themes that support the key indices. Section 1006 shows examples posts/comments underlying a given discovered key theme. Sections 1008 and 1010 are formats for showing trends in the stories discovered over three fiscal quarters, Q2, Q3 and Q4. Section 1010 includes shorthand symbols, 1012, 1014, and 1016, to summarize and convey trends more quickly. For example, the story "Consumer Concerns with Insurers—Refusing Treatment," had a 2% conversation volume, which ranked $13^{th}$ (symbol 1012) amongst all stories discovered in the competitive set. The downward arrow (symbol 1014) shows that this story has decreased in conversational volume ranking compared to a prior quarter and the smaller pyramid (symbol 1016) indicates that Company D had a smaller share of voice on this story relative to the competitive set.

The formats shown in FIG. 10, as well as the formats shown in FIGS. 5, 6 and 7, are illustrative and not meant to limit the scope of the disclosed embodiments. A wide variety of formats and reporting scenarios are contemplated by the present disclosure.

Thus, the present disclosure and exemplary embodiments described herein provide systems and methodologies for extracting, organizing and analyzing targeted intelligence from a variety of web locations, such as forums, blogs, news sites, review sites, social sites and others. The disclosed systems and methodologies provide technical features and benefits that improve the efficiency and reduce the cost and complexity of resources needed in order to provide reliable and useful responses to targeted, complex and sophisticated web inquiries. For example, unlike conventional broad indices, the disclosed systems and methodologies support the efficient development of targeted indices focused on the particular concerns of the subject entity. Further, the disclosed systems and methodologies provide a modified SMM search tool that incorporates a robust expression-based cognitive data analysis technology such as IBM Watson. IBM Watson is an expression-based cognitive technology that processes information more like a human than a computer, through understanding natural language, generating hypotheses based on evidence and learning as it goes. Additionally, expression-based, cognitive computer analysis provides superior computing power to keyword-based computer analysis for a number of reasons, including the more flexible searching capabilities of "word patterns" over "keywords" and the very large amount of data that may be processed by expression-based cognitive data analysis. As described previously herein, expression-based cognitive data analysis methodologies may also be incorporated into other actions of the disclosed methodology to even further improve the efficiency and reduce the cost and complexity of resources needed in order to provide reliable and useful responses to targeted, complex and sophisticated web inquiries.

Further, the disclosed systematic analysis methodology includes a statistically based sampling approach that samples the data to arrive at a desired confidence level (e.g., 90% confidence level with a +/−5% standard error). The disclosed systematic sampling approach may be implemented with data analysis support from keyword-based SMM search tools and automated spreadsheet functionality such as provided by Excel. Alternatively, the disclosed systematic sampling approach may be implemented with data analysis support from a stand-alone expression-based cognitive data analysis module, and/or from a modified SMM search tool that incorporates a robust expression-based cognitive data analysis. As described previously in this disclosure, regardless of whether data analysis support is provided by keyword-based SMM search tools, automated spreadsheet functions, a modified expression-based, cognitive SMM search tool, or a stand-along expression based cognitive data analysis module, the disclosed statistically-based sampling approach (i.e., repeatedly sampling data to arrive at a predetermined confidence level) may be applied to improve the efficiency and reduce the cost and complexity of resources needed in order to provide reliable and useful responses to complex and sophisticated web inquiries. In addition to web-based data intelligence, other intelligence sources (e.g., enterprise data) may be incorporated within the disclosed systems and methodologies to provide even further insights and actionable takeaways.

Further, the disclosed systems and methodologies include further analytic processes that derive additional insights across all of the targeted indices and themes, and convey the insights in the form of actionable, "storytelling" takeaways. This eliminates the need for entities to further interpret and make connections amongst the targeted indices and themes from all of the representative comments within each theme of every targeted index. The "storytelling" analytic process may also be used to determine an entity's share of story relative to others, or share of conversation relative to others within a given story.

Accordingly, the present disclosure allows for the efficient extraction and analysis of web data to provide intelligence at a granular level on a wide array of subjects and formats, including but not limited to what explains the share of voice ranking for all of the indices (e.g. product & service innovation) amongst all competitors; how is a subject entity doing relative to others on share of voice (as it relates to the targeted indices); how do the targeted indices of an entity with respect to conversational volume compare to the order of the share of voice of the indices for competitors; how is an entity doing relative to competitors on volume and sentiment indices; how is an entity doing relative to competitors with respect to social channel representation; and how is an entity doing relative to competitors with respect to "stories" discovered within the granular data set of indices and themes (e.g. is an entity in the discovered story, and, if so, what is its share of voice in that story relative to other competitors).

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The descriptions of the various embodiments of the present disclosure have been presented for purposes of illustration, but are not intended to be exhaustive or limited to the embodiments disclosed. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for gathering and processing web data, the system comprising:
   a memory; and
   a processor system communicatively coupled to the memory;
   wherein the processor system includes an expression-based social media monitoring (SMM) search tool and an expression-based cognitive data analysis tool;
   wherein the processor system is configured to perform a method comprising:
   using said expression-based SMM search tool to pull from a world wide web an initial data universe comprising web data relevant to a targeted index that has been identified by an entity as being of importance to said entity;
   receiving an initial set of themes relevant to said targeted index and discovered from said initial data universe;
   using said expression-based cognitive data analysis tool to code said initial data universe under said initial set of relevant themes to filter portions of said initial data universe that fall under said initial set of relevant themes and portions of said initial data universe that do not fall under said initial set of relevant themes;
   using said expression-based cognitive data analysis tool to analyze said portions of said initial data universe that do not fall under said initial set of relevant themes to identify any additional themes relevant to said targeted index; and
   in the event that said additional relevant themes are identified, using said expression-based cognitive data analysis tool to code under said additional sets of relevant themes said portions of said initial data universe that do not fall under said initial set of relevant themes;
   wherein said targeted index is defined by said coded portions of said initial data universe that fall under said initial set of relevant themes, along with said coded portions of said data universe that fall under said additional relevant themes;
   wherein said further coding under said additional relevant themes is repeated until an accuracy confidence level for said initial set of relevant themes meets or exceeds a threshold.

2. The system of claim 1, wherein the method performed by the processor system further comprises using a third module to further define said targeted index by other data relevant to said targeted index but not pulled from the world wide web.

3. The system of claim 1 wherein the system conveys insights about said targeted index and said top-level inquiry identified by said entity as being of importance to said entity by representing said insights visually on a user interface.

4. The system of claim 3 wherein said insights comprise narrative stories derived from:
   said coded portions of said initial data universe that fall under said initial set of relevant themes; and
   said coded portions of said initial data universe that fall under said additional relevant themes.

* * * * *